(12) United States Patent
Ma

(10) Patent No.: US 8,107,811 B1
(45) Date of Patent: Jan. 31, 2012

(54) IMAGE CAPTURE DEVICE

(75) Inventor: Feng-Yang Ma, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/909,863

(22) Filed: Oct. 22, 2010

(30) Foreign Application Priority Data

Jul. 16, 2010 (TW) .............................. 99123408 A

(51) Int. Cl.
*G03B 17/00* (2006.01)
(52) U.S. Cl. ..................................................... 396/535
(58) Field of Classification Search .................. 396/529, 396/535, 542; 348/373, 374
See application file for complete search history.

(56) References Cited

U.S. PATENT DOCUMENTS

| | | | |
|---|---|---|---|
| 7,977,584 B2* | 7/2011 | Kameyama | 174/561 |
| 2005/0219399 A1* | 10/2005 | Sato et al. | 348/340 |
| 2005/0248684 A1* | 11/2005 | Machida | 348/373 |
| 2007/0280678 A1* | 12/2007 | Chien et al. | 396/529 |
| 2008/0291322 A1* | 11/2008 | Schick | 348/374 |
| 2009/0324213 A1* | 12/2009 | Wang | 396/529 |
| 2010/0232034 A1* | 9/2010 | Polyakov et al. | 359/694 |
| 2011/0051374 A1* | 3/2011 | Chen | 361/709 |

\* cited by examiner

*Primary Examiner* — W.B. Perkey
(74) *Attorney, Agent, or Firm* — Altis Law Group, Inc.

(57) ABSTRACT

An image capture device includes a front shell, a circuit board, an image sensor, an elastic sheet, and threaded fasteners. The front shell includes a rear surface. The front shell defines three first threaded holes in the rear surface. The circuit board is positioned on the rear surface and defines at least three second threaded holes. The second threaded holes are aligned with the first threaded holes. The image sensor is positioned on the circuit board. The elastic sheet is positioned on the rear surface and covers the circuit board. The elastic sheet includes a number of elastic arms. The elastic arms protrude towards the circuit board and resisting against the circuit board. The threaded fasteners correspondingly pass through and engage with the first threaded holes and the second threaded holes to secure the circuit board to the rear surface. The threaded fasteners are capable of adjusting the circuit board.

11 Claims, 5 Drawing Sheets

IMAGE CAPTURE DEVICE

BACKGROUND

1. Technical Field

The present disclosure relates to an image capture device.

2. Description of Related Art

Image capture devices often include a front shell, a lens module, a circuit board, and an image sensor positioned on the circuit board. The front shell includes a front surface and a rear surface facing away from the front surface. The lens module is positioned on the front surface. The circuit board is positioned on the rear surface.

During assembly, the image sensor may misalign with the lens module, adversely affecting image quality of the image capture devices.

Therefore, it is desirable to provide an image capture device which can overcome the limitations described.

BRIEF DESCRIPTION OF THE DRAWINGS

Many aspects of the present disclosure can be better understood with reference to the accompanying drawings. The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Embodiments of the present disclosure will now be described in detail and with reference to the drawings.

Figure 1:
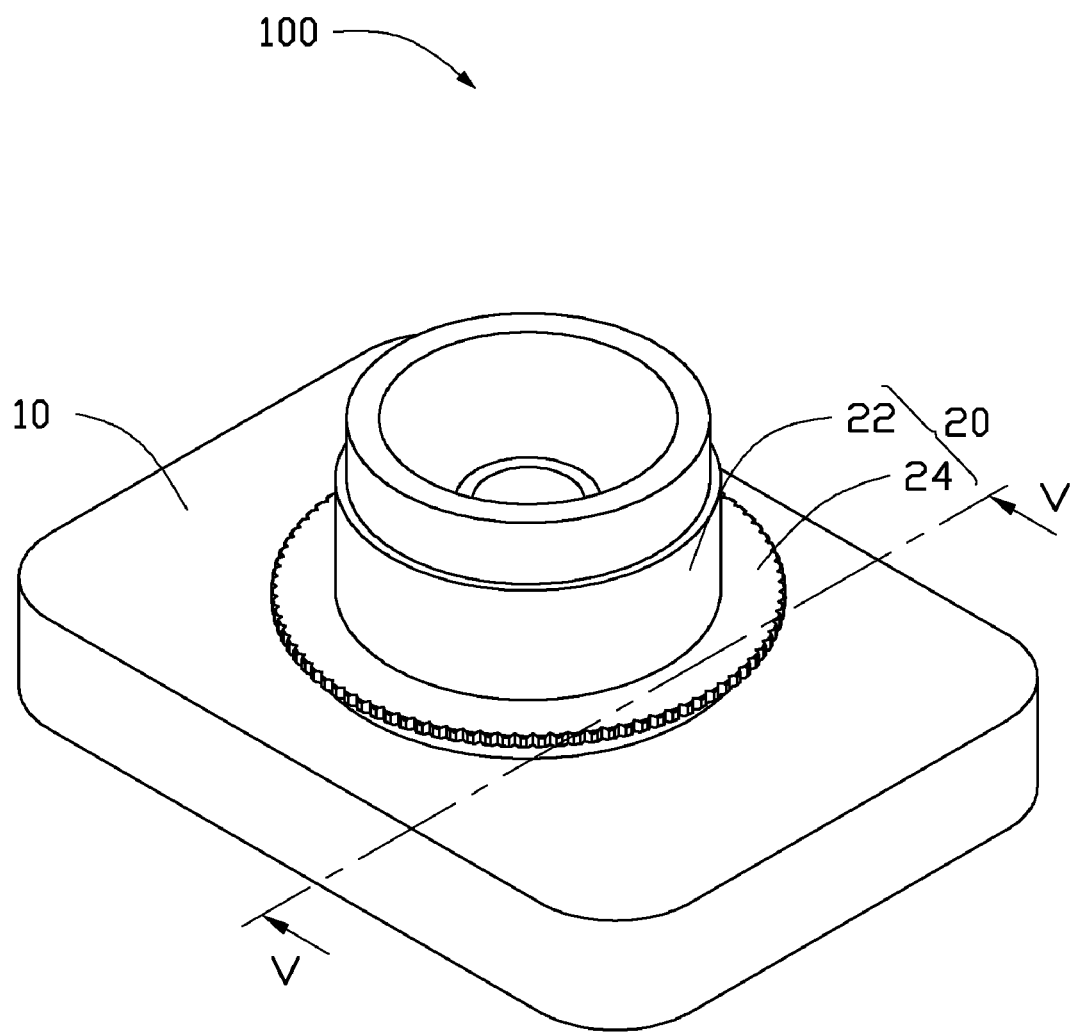
FIG. 1 is an assembled, isometric view of an image capture device, according to an exemplary embodiment.
Figure 2:
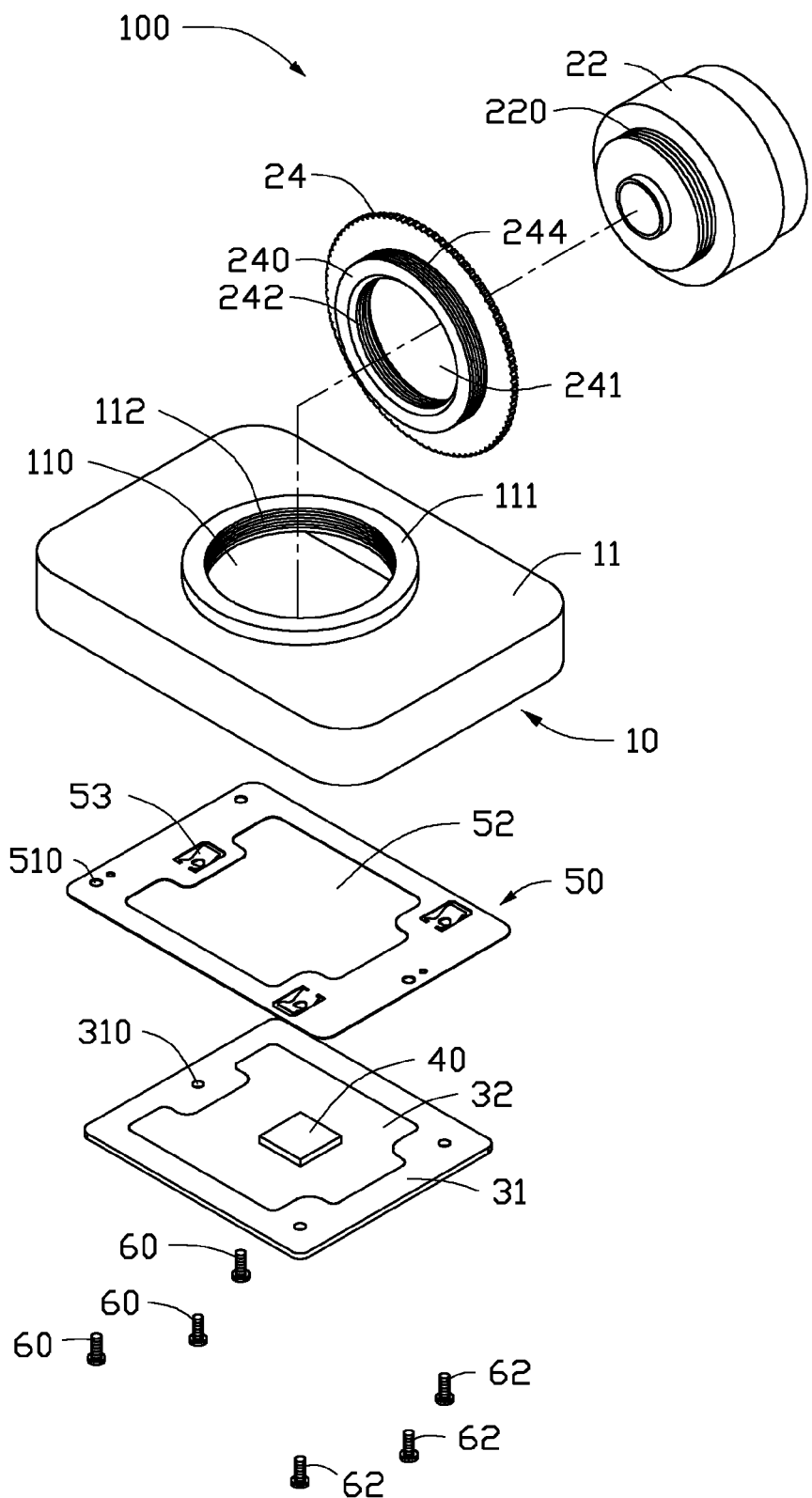
FIG. 2 is an exploded, isometric view of the image capture device of FIG. 1.
Figure 3:
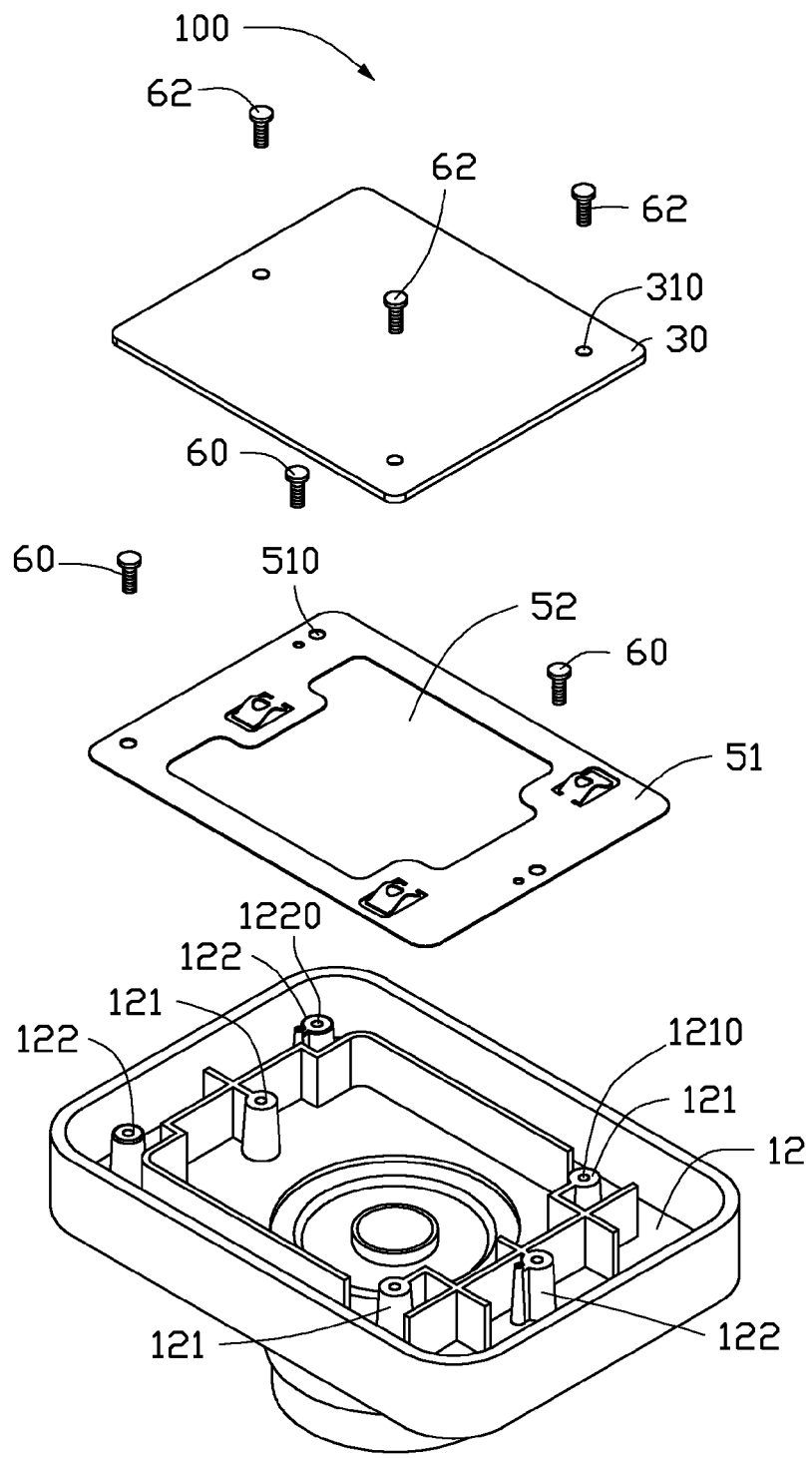
FIG. 3 is similar to FIG. 2, but viewed in another angle.

Referring to FIGS. 1-3, an image capture device 100, according to an exemplary embodiment, includes a front shell 10, a lens module 20, a circuit board 30, an image sensor 40, and an elastic sheet 50.

The front shell 10 is a rectangular frame and includes a front surface 11 and a rear surface 12 facing away from the front surface 11. The front shell 10 defines a first circular opening 110 extending through the center of the front surface 11 and the rear surface 12. A first annular raised portion 111 projects from the front surface 11 at the periphery of the first opening 110 and is integrally formed with the front shell 10. An inner sidewall of the first raised portion 111 has first female threads 112 formed thereon. Three first studs 121 and three second studs 122 extend rearwards from the rear surface 12. Each first stud 121 defines a first threaded hole 1210. Each second stud 122 defines a second threaded hole 1220.

The lens module 20 is positioned on the front surface 11. The lens module 20 includes a lens barrel 22, at least one lens (not shown) received in the lens barrel 22, and a focus ring 24. The focus ring 24 defines a second circular opening 241 generally at the center thereof. A second annular raised portion 240 projects from the periphery of the second opening 241 and is integrally formed with the focus ring 24. An external sidewall of the second annular raised portion 240 has first male threads 244 formed thereon to match the first female threads 112 of the front shell 11. An internal sidewall of the second annular raised portion 240 has second female threads 242 formed thereon. An external sidewall of the lens barrel 22 has second male threads 220 formed thereon. The second male threads 220 match the second female threads 242.

The circuit board 30 can be made of a material such as: polyimide, ceramic, or glass fiber. In the present embodiment, the circuit board 30 is made of ceramic. The circuit board 30 has a supporting surface 31. The supporting surface 31 bears a layer of heat dissipation material 32. The heat dissipation material 32 is made of copper. The circuit board 30 defines three third threaded holes 310 aligned with the corresponding first threaded holes 1210 of the front shell 10.

The image sensor 40 is a charged coupled device (CCD) or a complementary metal-oxide-semiconductor transistor (CMOS). In the present embodiment, the image sensor 40 is a CCD. The image sensor 40 is configured to convert light signals captured by the lens module 20 to electrical signals. The image sensor 40 can be mechanically and electrically packaged on the supporting surface 31 of the circuit board 30 by chip-scale package (CSP), wafer-level chip-scale, ceramic leaded chip carrier (CLCC), plastic leaded chip carrier (PLCC), thermal compression bonding, or flip chip packaging, for example. In the present embodiment, the image sensor 40 is mechanically and electrically packaged on the supporting surface 31 of the circuit board 30 by CSP. The image sensor 40 is surrounded by the heat dissipation material 32 which efficiently evacuates heat generated by the image sensor 40 and the circuit board 30.

The elastic sheet 50 is rectangular and covers the circuit board 30, sandwiched between the rear surface 12 of the front shell 10 and the circuit board 30. In the present embodiment, the elastic sheet 50 is made of copper. The elastic sheet 50 includes a first surface 51 facing the circuit board 30 and defines an opening 52 corresponding to the heat dissipation material 32 of the circuit board 30 in shape. The elastic sheet 50 further includes three elastic arms 53 protruding towards the circuit board 30 and resisted against the circuit board 30. The elastic arms 53 are integrally formed with the elastic sheet 50 and are positioned at two opposite sides of the first surface 51. In this embodiment, the three elastic arms 53 cooperatively form an isosceles triangle. The elastic sheet 50 defines three fourth threaded holes 510 aligned with the corresponding second threaded holes 1220 of the front shell 10.

The number of elastic arms 53 is not limited to that disclosed in the present embodiment, and can be more than three and respectively positioned on at least two opposite sides of the first surface 51.

In assembly, the second male threads 220 of the lens barrel 22 mesh with the second female threads 242 of the focus ring 24 to assemble the focus ring 24 to the lens barrel 22. The first male threads 244 of the focus ring 24 mesh with the first female threads 112 of the front shell 10 to assemble the assembled lens module 20 to the front surface 11 of the front shell 10. The three second threaded holes 510 are aligned with the second studs 122 of the front shell 10, and a number of first threaded fasteners 60 are threadedly engaged with the fourth threaded holes 510 and the second threaded holes 1220 to assemble the elastic sheet 50 to the front shell 10. Finally, the third threaded holes 310 of the circuit board 30 are aligned with the first threaded holes 1210 of the front shell 10, and a number of second threaded fasteners 62 mesh with the third threaded holes 310 and the first threaded holes 1210 to assemble the circuit board 30 to the front shell 10; the image sensor 40 extends through the opening 52 of the elastic sheet 50 and the circuit board 30 resists against the three elastic arms 53 of the elastic sheet 50.

Figure 4:
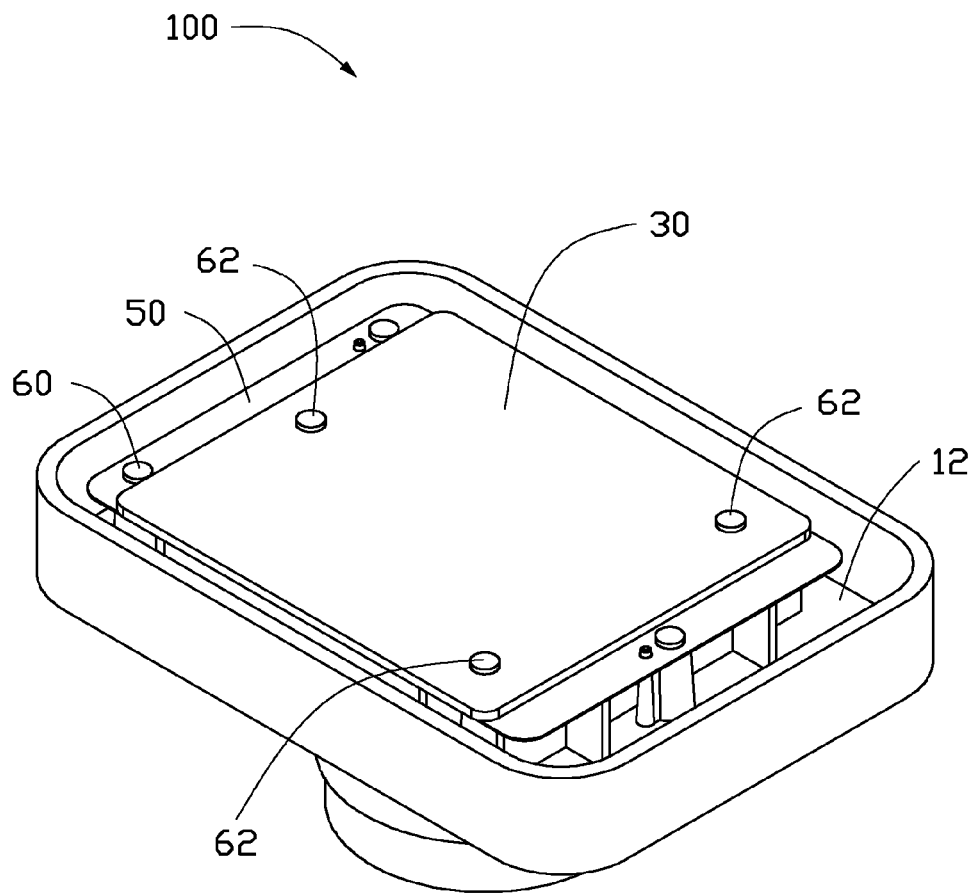
FIG. 4 is an assembled, isometric view of the image capture device of FIG. 3.
Figure 5:
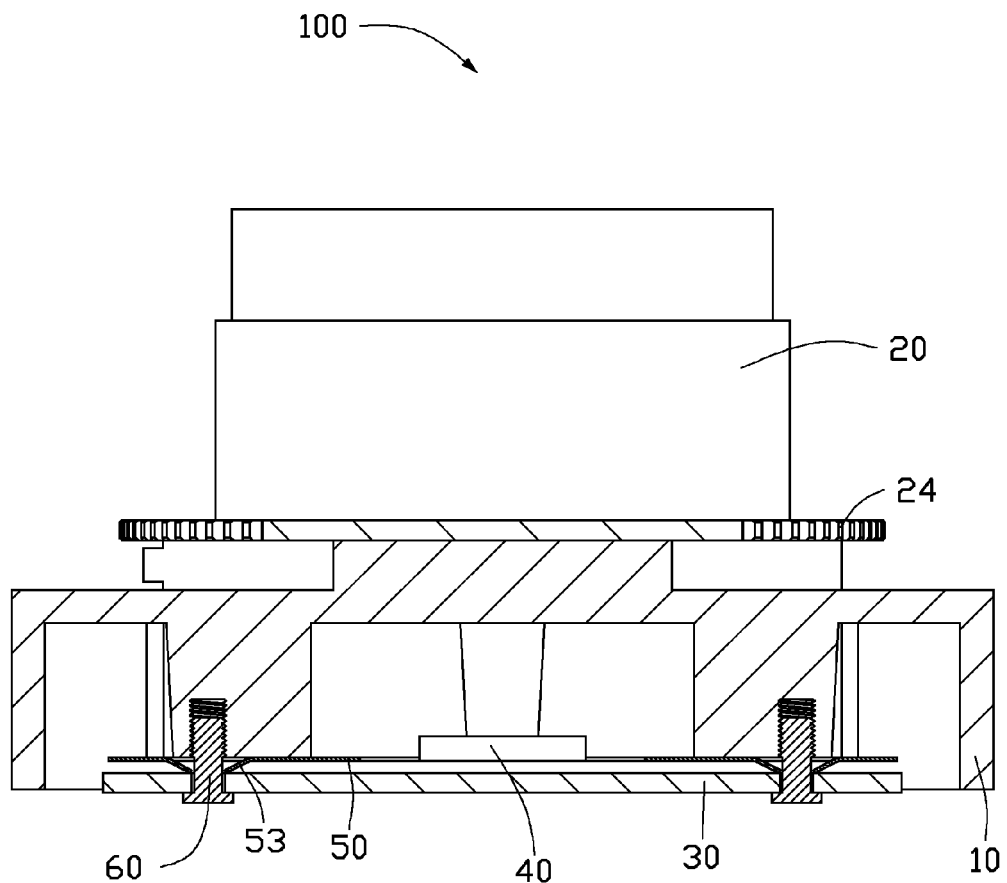
FIG. 5 is a cross-section taken along a line V-V of FIG. 1.

Also referring to FIGS. 4-5, when the center of the image sensor 40 misaligns with the optical axis of the lens module 20, images captured by the image capture device 100 distort. To eliminate this distortion, the three second threaded fasteners 62 are capable of adjusting the circuit board 30, such that the optical axis of the lens module 20 is perpendicular to the image sensor 40 by the thread engagement of the three second threaded fasteners 62 with the three third threaded holes 310 and the three first threaded holes 1210.

It will be understood that the above particular embodiments are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. An image capture device, comprising:
a front shell comprising a front surface and a rear surface facing away from the front surface, the front shell defining at least three first threaded holes in the rear surface;
a lens module positioned on the front surface;
a circuit board positioned on the rear surface of the front shell and defining at least three second threaded holes, the at least three second threaded holes aligned with the at least three first threaded holes;
an image sensor positioned on and electrically connected to the circuit board;
an elastic sheet positioned on the rear surface and covering the circuit board, the elastic sheet comprising a plurality of elastic arms, the elastic arms protruding towards the circuit board and resisting against the circuit board; and
at least three first threaded fasteners correspondingly passing through and engaging with the at least three first threaded holes and the at least three second threaded holes to secure the circuit board to the rear surface, the at least three first threaded fasteners capable of adjusting the circuit board such that the optical axis of the lens module is perpendicular to the image sensor by the thread engagement of the at least three threaded fasteners with the at least three first threaded holes and the at least three second threaded holes.

2. The image capture device of claim 1, wherein at least three first studs extend rearwards from the rear surface, each first stud defines a respective one of the at least three first threaded holes.

3. The image capture device of claim 1, wherein at least three second studs extend rearwards from the rear surface, each second stud defines a third threaded holes, the elastic sheet defines at least three fourth threaded holes, the at least three fourth threaded holes are aligned with and correspond to the at least three second studs, at least three second threaded fasteners mesh with the third and fourth threaded holes to assemble the elastic sheet to the front shell.

4. The image capture device of claim 1, wherein the front shell defines a first circular opening extending through the center of the front surface and the rear surface, a first annular raised portion projects from the periphery of the first opening, an inner sidewall of the first raised portion has first female threads, the lens module comprises a lens barrel and a focus ring assembled with the lens barrel, the focus ring defines a second circular opening generally at a center thereof, a second annular raised portion projects from the periphery of the second circular opening, an external sidewall of the second raised portion has first male threads, the first male threads match the first female threads of the front shell, the focus ring is assembled to the front shell by the thread engagement of the first male threads with the first female threads.

5. The image capture device of claim 4, wherein the first annular raised portion is integrally formed with the front shell, and the second annular raised portion is integrally formed with the focus ring.

6. The image capture device of claim 4, wherein an internal sidewall of the annular second raised portion has second female threads, an external sidewall of the lens barrel has second male threads, the second male threads mesh with the second female threads, the lens barrel is assembled with the focus ring by the thread engagement of the second male threads with the second female threads.

7. The image capture device of claim 1, wherein the circuit board has a supporting surface, the supporting surface bears a layer of heat dissipation material, the image sensor is positioned on the supporting surface and surrounded by the heat dissipation material.

8. The image capture device of claim 7, wherein both the elastic sheet and the heat dissipation material are made of copper.

9. The image capture device of claim 7, wherein the elastic sheet defines an opening corresponding to the heat dissipation material of the circuit board in shape, the image sensor extends through the opening of the elastic sheet.

10. The image capture device of claim 1, wherein the elastic arms are integrally formed with the elastic sheet and are positioned at two opposite sides of the elastic sheet.

11. The image capture device of claim 10, wherein the elastic arms comprises three elastic arms, the three elastic arms cooperatively form an isosceles triangle.

* * * * *